Nov. 14, 1967  B. G. HADLEY  3,352,508
SELF-REWINDING RIGGING DEVICE
Filed Nov. 12, 1965  3 Sheets-Sheet 1
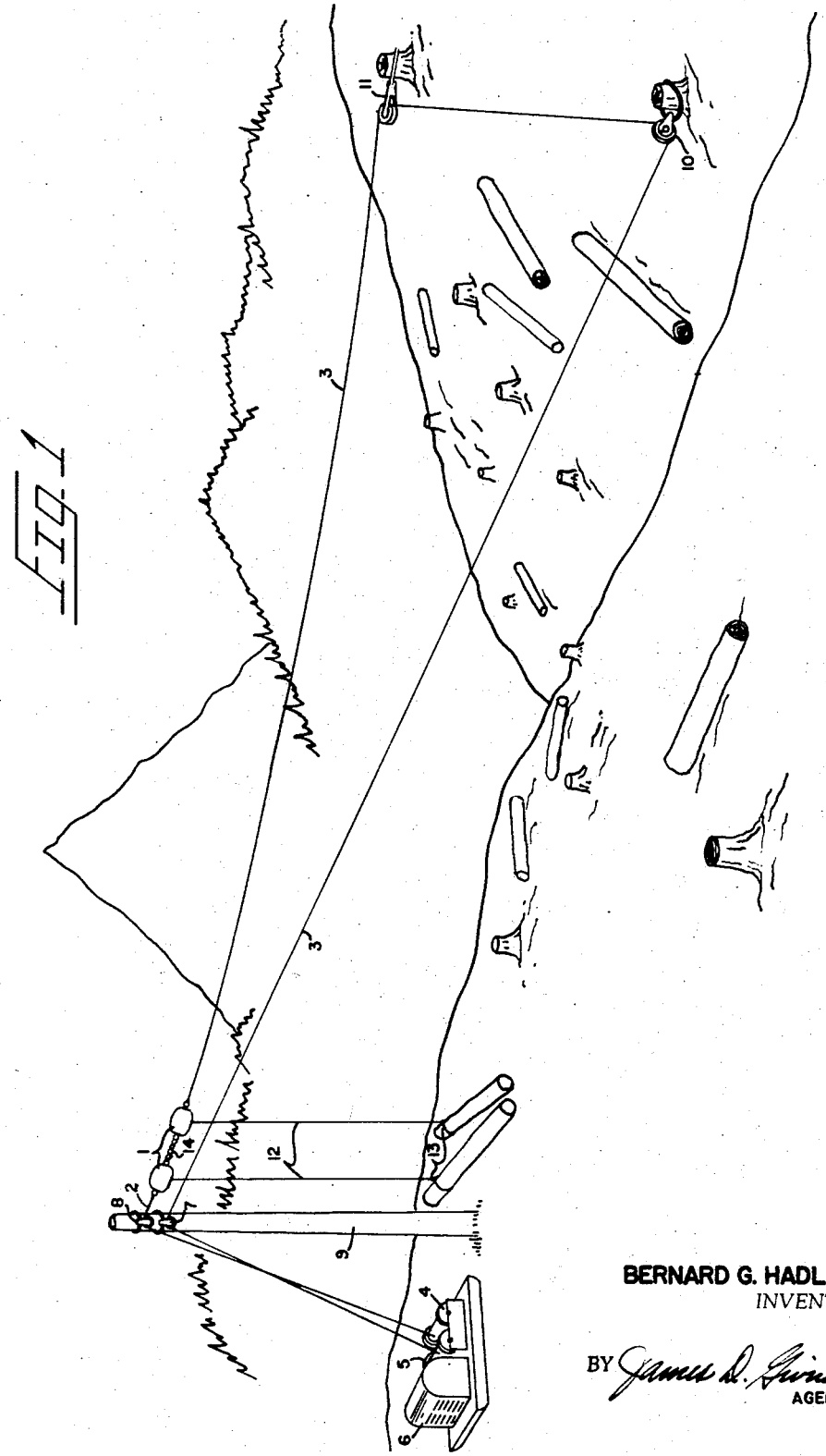
BERNARD G. HADLEY
INVENTOR.
BY
AGENT Nov. 14, 1967
B. G. HADLEY
3,352,508
SELF-REWINDING RIGGING DEVICE
Filed Nov. 12, 1965
3 Sheets-Sheet 2
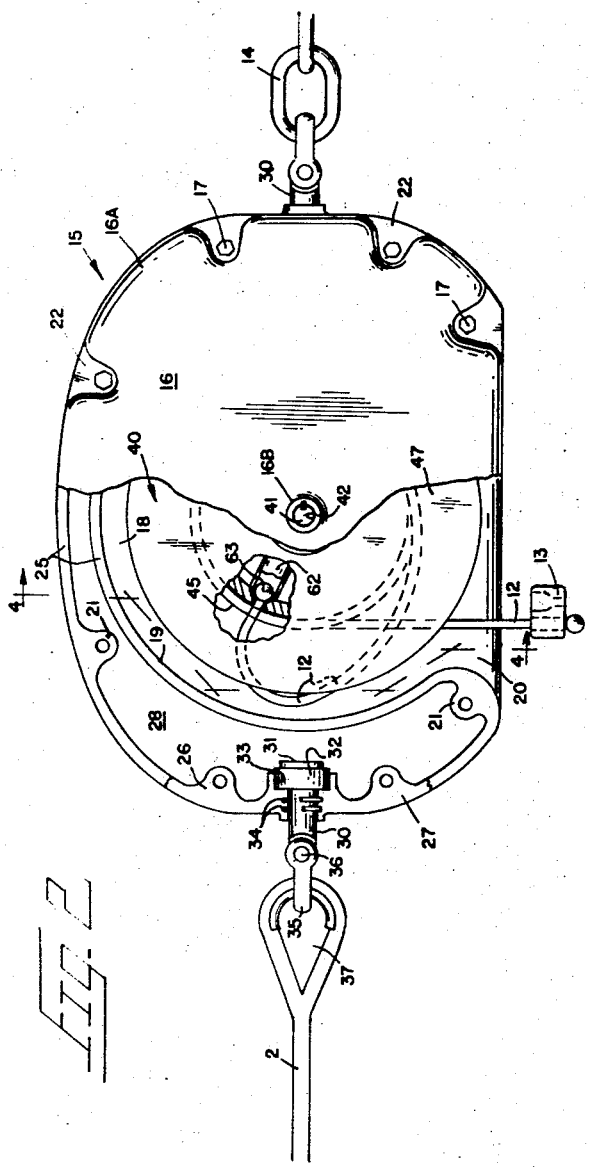
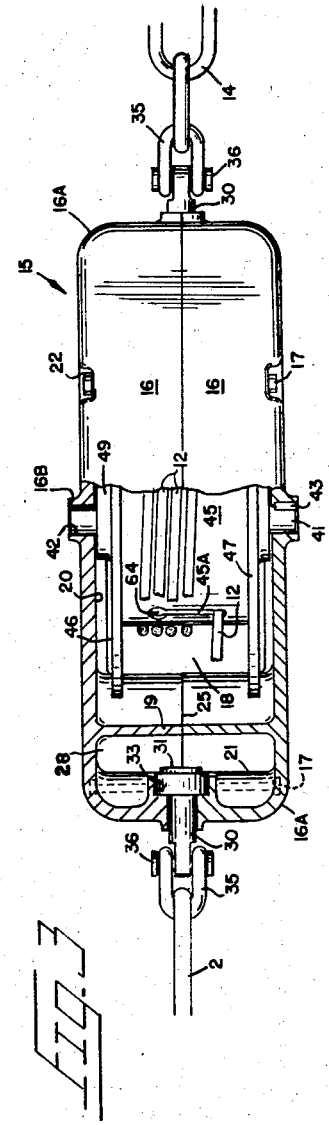
BERNARD G. HADLEY
INVENTOR.
BY *James D. Givens Jr.*
AGENT Nov. 14, 1967  B. G. HADLEY  3,352,508
SELF-REWINDING RIGGING DEVICE
Filed Nov. 12, 1965  3 Sheets-Sheet 3
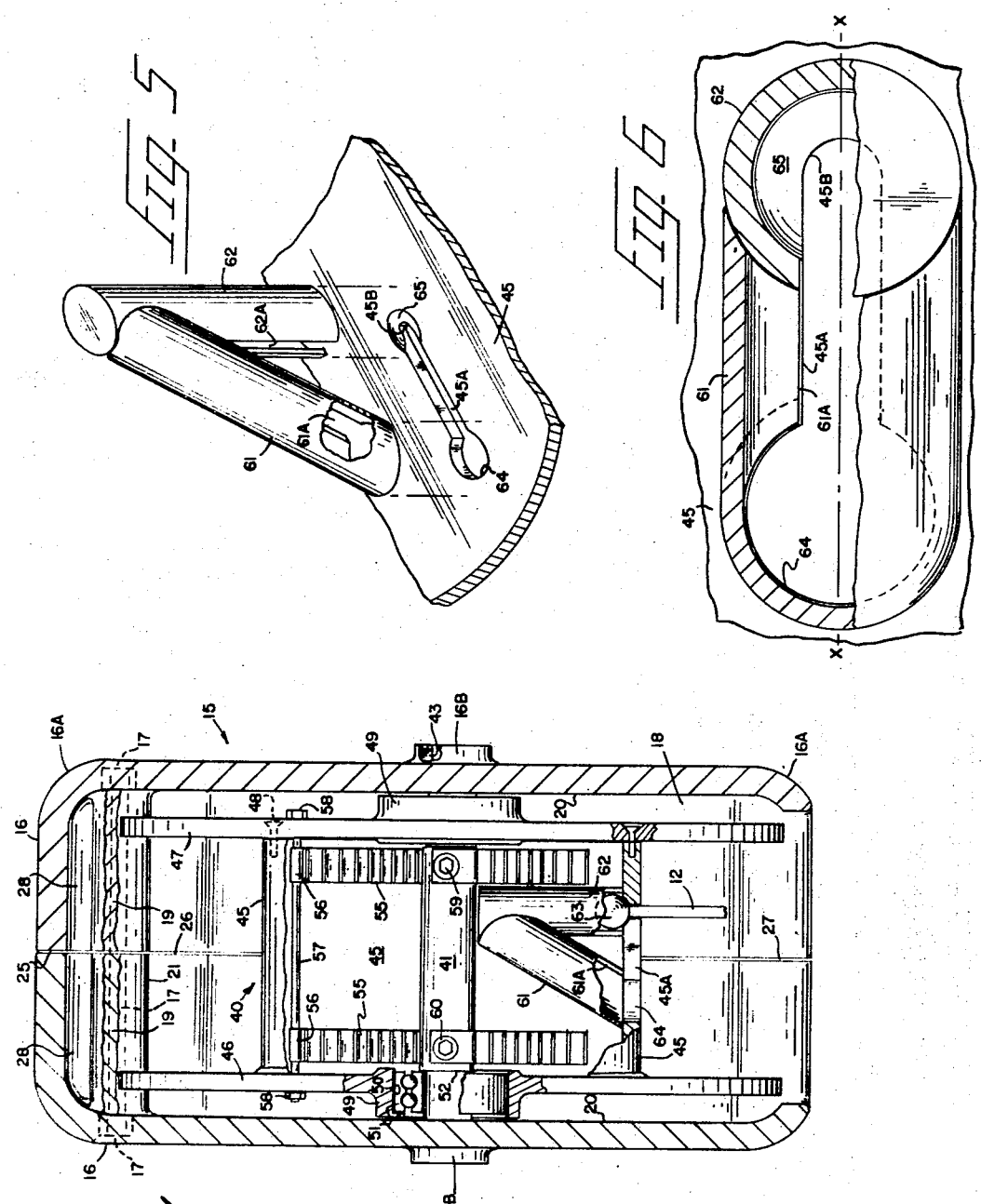
BERNARD G. HADLEY
*INVENTOR.*
BY
AGENT United States Patent Office 3,352,508
Patented Nov. 14, 1967

3,352,508
SELF-REWINDING RIGGING DEVICE
Bernard G. Hadley, Rte. 2, Box 768,
Creswell, Oreg. 97426
Filed Nov. 12, 1965, Ser. No. 507,431
5 Claims. (Cl. 242—107)

ABSTRACT OF THE DISCLOSURE

A rigging device for use in a hi-lead type logging operation carrying a length of log pick-up cable on a drum which is spring powered to retract the cable when the latter is not attached to a log. The drum is protected from severe impacts by concealment within a housing and is provided with attaching means securing the end of the pick-up cable in a manner permitting the same to be readily disengaged from the drum for replacement purposes.

---

This invention relates to logging equipment and more particularly to a self-rewinding rigging device used in that type of yarding or loading operation known as hi-lead in the art. This type of yarding operation has, in the Northwestern part of the United States, substantially superceded that type of logging known as sky line and differs therefrom by utilizing only one spar tree and a single run of cable which serves the dual functions of suspending and conveying the logs. Another significant difference for the purposes of the present invention resides in the fact that the rigging device of any hi-lead operation (attaching the pick-up cable to the main cable) comes into contact with the ground and in some instances encounters severe impacts against rocks, logs, stumps, etc., as it is dragged thereover. The counterpart of the present device in sky line logging is termed a carriage and is supported and travels an elevated path intermediate two spar trees, and hence is not subjected to ground contact. The present invention is particularly useful in hi-lead logging and provides for rewinding of a pick-up cable not possible with present hi-lead rigging devices.

An important object of this invention is the provision of a rigging device embodying a spring biased rewind drum on which is carried the log pick-up cable. Presently used throughout hi-lead operations are rigging devices from which depend, by means of a swivel attachment, a pick-up cable of fixed length at the lower terminus of which are choker fittings enabling the cable to be attached about the log or logs in a sling manner. These fittings carried at the end of a pick-up cable, thirty feet or so in length, are susceptible to rapid movement by the whip-like action of the pick-up cable induced by rapid deflections of the main cable. Serious, and occasionally fatal, injuries have resulted from such action of the lower end of the pick-up cable and choker fittings. The problem is accentuated when two or more pick-up cables depend from a single main cable and during unloading the first pick-up cable unloaded is released resulting in it thrashing about in the immediate work area of the crew unloading the second pick-up cable.

A further object of the present rigging device is to expedite the yarding or collecting of logs by eliminating to a large extent the tangling of pick-up cables with foreign objects as well as with each other. Such tangling is undesirable both from the time lost in separating the cables and the shortened life of the damaged cable.

A further important feature of the present rigging device is the attachment means securing the pick-up cable end and the winding drum on which said cable is carried. In view of adverse and often remote conditions under which logging is conducted, dismantling of equipment for cable replacement is impractical. As pick-up cables are replaced periodically, it is an important feature of the present device to include means for securing one end of a pick-up cable within the drum without dismantling the rigging device and without the use of tools.

These and other objects will become subsequently apparent upon a reading and understanding of the following specification and drawings in which:

FIGURE 1 is a perspective view showing the general arrangement of a hi-lead yarding operation incorporating the present rigging device.

FIGURE 2 is a side elevational view of the present device with parts broken away for illustrative purposes.

FIGURE 3 is a plan view similar to FIGURE 2.

FIGURE 4 is a vertical, sectional view taken approximately along line 4—4 of FIGURE 2 with the drum rotated for purposes of illustration and with fragments of the drum removed.

FIGURE 5 is a perspective, exploded view of cable attaching means interior of the cable drum for releasably securing one end of a pick-up cable.

FIGURE 6 is a plan view, with fragments broken away, of the cable attaching means shown in FIGURE 5.

With continuing reference to the drawings and particularly FIGURE 1, illustrating a hi-lead yarding operation, reference numeral 1 indicates generally a pair of rigging devices of the present invention tandemly supported by a main cable 2 and a haul back cable 3, the opposite ends of which are mounted on powered drums 4 and 5 respectively of a yarder or donkey engine 6. A pair of pulley blocks 7 and 8 are mounted at the upper end of a spar tree 9 and receive cables 2 and 3. Haul back cable 3 is additionally entrained through two remotely spaced pulley blocks 10 and 11 positioned near ground level and for practical reasons most commonly secured to tree stumps. The blocks 10 and 11, commonly referred to as "tail blocks," are typically located up to approximately thirteen hundred feet from the spar tree 9 and approximately eighty feet separation therebetween. The foregoing provides a means for powered movement by main cable 2 of the rewind assemblies 1 along an inclined path from a loading location adjacent the block 11 to an unloading point adjacent the spar tree 9 and oppositely, return of the rigging devices 1 by the haul back cable 3. As operatively shown in FIGURE 1, the logs are suspended by a pick-up cable 12 having choker fittings 13 at its lower end and secured at its upper end to the rigging device 1. A length of chain 14 interconnects the pair of rigging devices.

With particular regard to the self-rewinding rigging device 1, a drum housing indicated generally at 15 comprises a pair of matching members 16 secured in an opposed manner by means of transverse tie bolts 17. Members 16 are preferably of cast metal and formed so as to provide a drum receiving area 18 when joined in bolted engagement. As best shown in FIGURE 2, the area 18 is defined by a transversely extending, arcuate wall 19 and interior sidewalls 20 of the members 16.

It will be noted that the outer marginal edges 16A of the cast members 16 are formed on a radius to provide a housing particularly sturdy and able to withstand substantial impact loads. Concentric bosses 21 are provided transversely of the members 16 for the reception of tie bolts 17, the latter extending through the members 16 terminating within recessed areas 22 provided within the marginal edge 16A of the housing 15.

Disposed between matching surfaces 25 of the members 16 including the wall 19 are gaskets 26 and 27 respectively provided for sealing the housing's interior, indicated at 28.

Journalled within the opposite ends of housing 15 are outwardly extending swivel posts 30 each having a head portion 31 in restrained engagement with the inner race (not shown) of a suitable bearing 32 of the combination radial-thrust type. The outer race of bearing 32 is seated within opposed semi-circular inset areas 33 formed in the end walls of the members 16. Sealing means in the form of O rings are indicated at 34 which, along with gaskets 26 and 27, prevent foreign matter from entering the interior 28 of the housing. The outer end of each post 30 is provided with a shackle 35 pivotally attached as at 36 and receiving at one end of the housing, the eye 37 formed by the spliced end of the main cable 2 and, at the housing's other end, the chain 14. In applications where a single rigging device is used, the right hand shackle 35 of FIGURE 2 is linked directly to the haul back cable 3.

The winding drum assembly, indicated generally at 40, and shown substantially in vertical section in FIGURE 4 is rotatably carried by a fixed spindle 41, the latter terminating in corresponding bores 42 centrally formed in bosses 16B of the members 16. A key 43 secures the spindle against movement. The drum per se is indicated at 45 and includes a flange plate 46 integal therewith and a second flange plate 47 in bolted engagement as at 48 about the drum periphery. Each flange plate has a centrally disposed boss 49 internally bored as at 50 to receive the outer race of a heavy duty, sealed bearing 51. The inner race of bearing 51 is positioned by an annular shoulder 52 formed on spindle 41.

Spring biasing means for rotation of the drum 40 to retrieve the pick-up cable 12 is provided by a pair of flat coil springs 55 housed internally of the drum 45. The outer ends of the springs 55 are looped at 56 to receive therein a crosswise rod 57 removably secured at 58 to the flange plates 46 and 47. The inner ends of the springs 55 are secured to the fixed spindle 41 by means of bolts 59 and washers 60, the latter preferably being curved to correspond to the underlying segment of spindle 41. From the foregoing it will be understood that, as viewed in FIGURE 2, the counterclockwise rotation of drum 45 incident to the unwinding or extracting of the cable will load springs 55.

FIGURES 4, 5 and 6 illustrate pick-up cable attaching means mounted within drum 45 which permits cable replacement without dismantling the rigging device which, as aforesaid, is often impractical in view of both the adverse conditions usually present and the costly downtime of the yarding operation. Secured to the inner periphery of the drum 45 as by welding are two tubular members 61 and 62 in open communication at their innermost ends and shown located medially of a plane x (FIGURE 5) common to the axis of spindle 41. Tubular member 61 is angularly disposed within the drum and constitutes a passageway for a ball fitting 63 secured to the end of pick-up cable 12. Drum 45 is apertured as at 64 to receive ball fitting 63 for passage into tubular member 61 after which inward, diagonal movement locates the fitting 63 and the adjacent end of cable 12 within the second tubular member 62, whereupon downward positioning (as viewed in FIGURE 4) will cause said fitting to seat within a concave bearing surface 65 formed on the interior of drum 45. The transverse, sliding movement of the portion of the pick-up cable 12 adjacent the fitting is permitted by an elongated opening 45A in the drum 45 and lengthwise slots 61A and 62A in tubular members 61–62 respectively.

In one cycle of operation the rigging devices 1 are positioned outwardly from the spar tree 9 by haul back cable 3 in the immediate area of the log or logs to be collected adjacent pulley block 11. The pick-up cable 12 of each device is manually pulled from its drum 45 to the length necessary to engage the choker fittings carried thereby with the log or logs. Upon careful initiation of inward movement of the rigging devices by main cable 2 and drum 4, the pick-up line 12 is fully unwound in a counterclockwise direction from drum 45 fully loading springs 55.

Under the supervision of the worker attaching the pick-up cable the main cable 2 is tensioned lifting or partially so the log or logs to be conveyed. Pivotal movement of the pick-up cable 12 while conveying the logs is achieved by movement of the ball fitting 63 within the concave bearing surface 65.

Upon transporting of the logs to a position adjacent the spar tree 9, the main cable 2 is slacked off lowering the logs to the ground whereupon the chocker fitting 13 are released. Detachment of the fittings allows pick-up cable 12 to be automatically retrieved by the winding drum assembly. Forceful impact of the fittings 13 against the housing 15 is avoided by reason of the fact that springs 55 are tensioned to exert a winding force on drum 45 adequate to retrieve the pick-up line and fittings 13 in a controlled manner. If desired, a limit stop in the form of a collar and engagable by the fittings may be incorporated into the housing 15 without departing from the spirit and scope of the present invention. Return of the rigging devices 1 to the log loading area by means of haul back cable 3 results in their being positioned approximately at ground level whereupon the pick-up cable is again unwound to the extent necessary for engagement with a subsequent log load.

Replacement of a frayed or damaged pick-up cable is accomplished by centripetal movement along tubular member 62 of the ball fitting 63 to align the latter with the axis of tubular member 61 whereupon disengagement is achieved by a diagonally directed, outward pull on the pick-up cable 12.

While I have shown a particular embodiment and application of my rigging device, it is to be understood that the present invention is applicable to other types of load conveying apparatus. Further, it is believed that changes may be readily self-apparent to those skilled in the art including various dispositions within the drum of the cable attaching means without departing from the spirit and scope of the present invention as hereinafter claimed.

I claim:

1. In a cable rigging device having a length of pick-up cable provided with a cable fitting at one of its ends and carried upon a spring powered drum rotatably mounted within a protective housing, the improvement comprising,
    pick-up cable attaching means secured to the interior of said drum and thereat in register with an elongated opening in said cable drum and comprising inwardly extending first and second tubular members in mutual open communication at their innermost ends whereby attachment of the pick-up cable to the drum is achieved by passage of the cable fitting through said elongated opening and said first tubular member into said second tubular member.

2. The invention as claimed in claim 1 wherein both of said tubular members have longitudinally disposed, intercommunicating slots formed therein for the passage therethrough of that portion of the pick-up cable adjacent the cable fitting.

3. The invention as claimed in claim 1 wherein said cable attaching means comprises a first tubular member secured at its outer end to the interior wall of said drum in register with one end of the elongated opening therein and a second tubular member similarly secured to said drum and in register with the opposite end of said elongated opening, both of said members in open communication at their inner ends and having lengthwise slots formed therein also in communication for the passage therethrough of that cable portion adjacent the cable fitting.

4. The invention as claimed in claim 3 wherein said drum includes a recessed area formed in the interior wall thereof adjacent the outer end of said second tubular member for supporting reception of the cable fitting.

5. A cable rigging device of the class described and adapted for use singly and in pairs on an elevated haul back cable in a logging yarding operation, each device comprising in combination, an oblong housing comprising corresponding matching members in bolted engagement to thereby define a drum receiving area and provided with a pair of swivel posts each journalled at one end of said housing for supported attachment thereof to opposed ends of a haul back cable in a manner permitting rotational movement of said housing relative to said haul back cable, said members further defining a horizontally extending opening subjacent said drum receiving area for passage therethrough of a pick-up cable, a rotatable drum assembly carried by said housing within said drum receiving area and including a spring powered cable drum for biased rotation of said drum, and pick-up cable attaching means secured to the interior of said drum and including inwardly extending tubular members in communication with an elongated opening formed in the periphery of said drum.

References Cited

UNITED STATES PATENTS

| 1,807,582 | 6/1931 | Brown | 242—125.1 |
|---|---|---|---|
| 2,597,615 | 5/1952 | Brown | 242—107 |
| 2,801,814 | 8/1957 | Fischer et al. | 242—107.4 |
| 2,946,562 | 7/1960 | Handley | 242—117 X |

FOREIGN PATENTS 607,582  10/1960  Canada.

FRANK J. COHEN, *Primary Examiner.*

WILLIAM S. BURDEN, *Examiner.*